United States Patent [19]
Tikalsky

[11] Patent Number: 5,875,179
[45] Date of Patent: Feb. 23, 1999

[54] METHOD AND APPARATUS FOR SYNCHRONIZED COMMUNICATION OVER WIRELESS BACKBONE ARCHITECTURE

[75] Inventor: Terry L. Tikalsky, Sunnyvale, Calif.

[73] Assignee: Proxim, Inc., Mountain View, Calif.

[21] Appl. No.: 739,224

[22] Filed: Oct. 29, 1996

[51] Int. Cl.⁶ ............................... H04J 3/06; H04J 13/06; H04B 7/216
[52] U.S. Cl. ..................... 370/315; 370/342; 370/350; 370/516; 375/202; 375/371
[58] Field of Search ..................... 370/254, 255, 370/256, 315, 320, 335, 342, 350, 441, 479, 503, 516; 375/202, 205, 354, 356, 371; 455/507, 509

[56] References Cited

U.S. PATENT DOCUMENTS

| | | | |
|---|---|---|---|
| 5,121,408 | 6/1992 | Cai et al. | 375/202 |
| 5,231,634 | 7/1993 | Giles et al. | 370/348 |
| 5,428,636 | 6/1995 | Meier | 370/256 |
| 5,442,659 | 8/1995 | Bauchot et al. | 375/202 |
| 5,453,977 | 9/1995 | Flammer, III et al. | 370/254 |
| 5,509,027 | 4/1996 | Vook et al. | 375/202 |
| 5,696,903 | 12/1997 | Mahany | 395/200.58 |

*Primary Examiner*—Hassan Kizou
*Attorney, Agent, or Firm*—Burns, Doane, Swecker & Mathis LLP

[57] ABSTRACT

The present invention is directed to providing wireless communication among a plurality of nodes and repeaters that are synchronized for communication with a central hub that constitutes a master repeater. For example, the present invention is directed to a wireless network having a wireless backbone of repeaters which can use frequency hopping to automatically establish synchronization despite dynamic changes in the wireless communication system. Exemplary embodiments provide for control of synchronization whereby a repeater, when introduced to the system, automatically scans for, and synchronizes to another repeater, while at the same time continuing to listen for other repeater signals which identify either the master repeater, or another repeater which is closer to the master repeater (i.e., communicates to the master repeater through a more direct communication link).

16 Claims, 2 Drawing Sheets

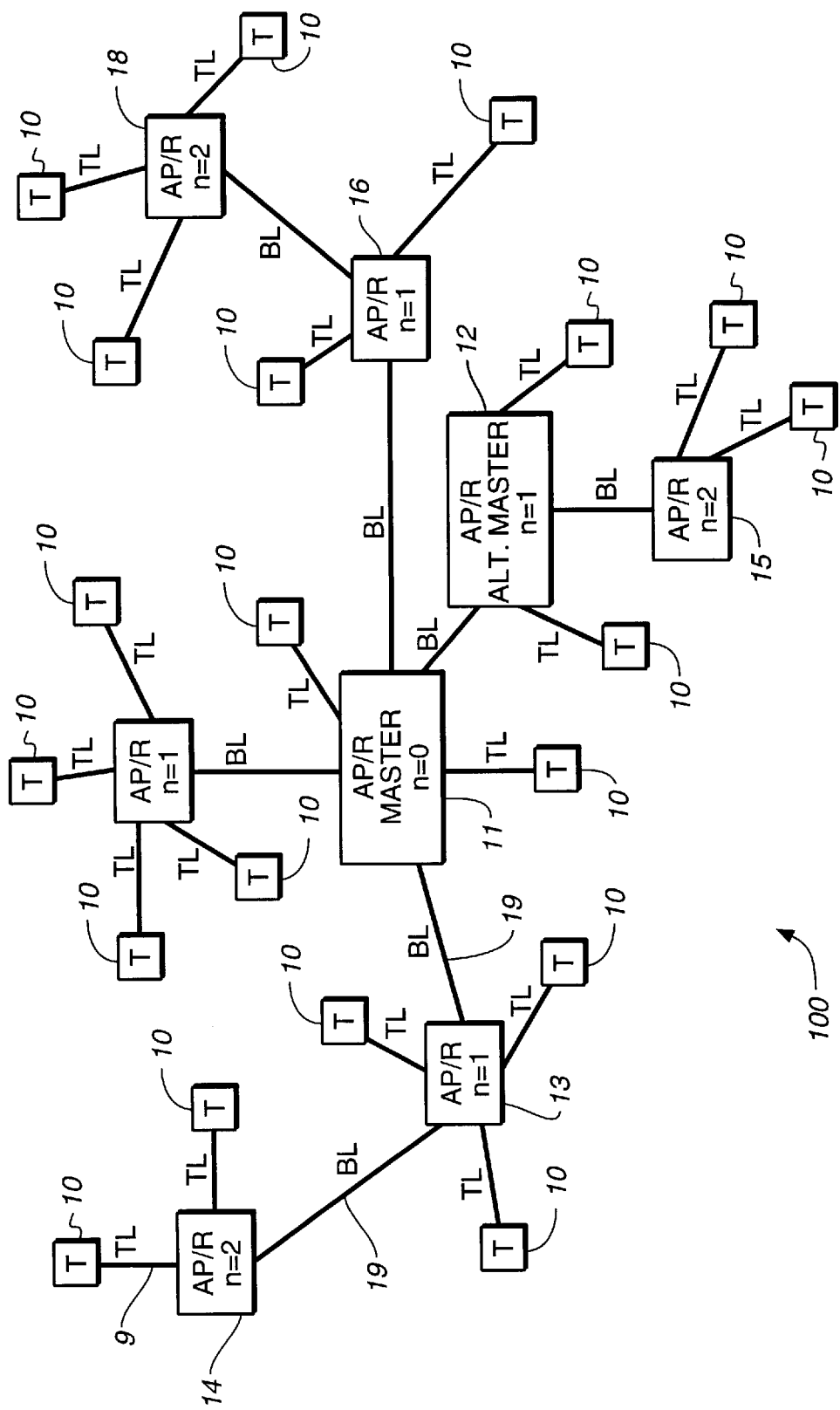
FIG._1

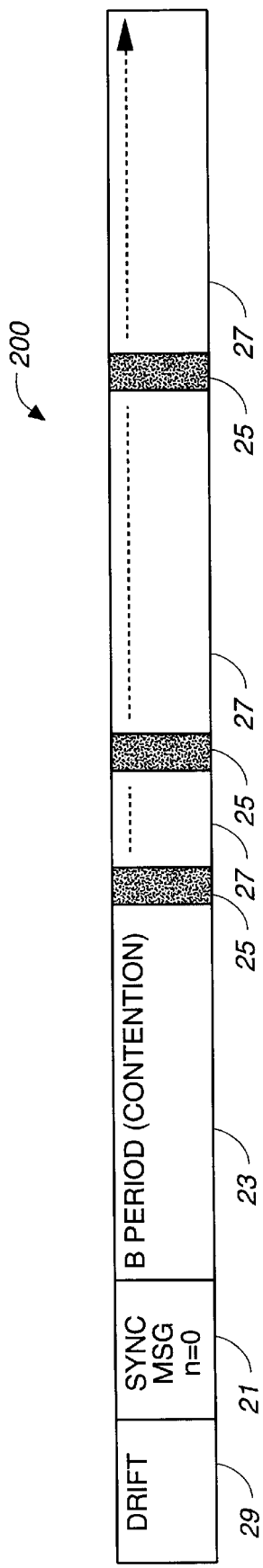
FIG._2

METHOD AND APPARATUS FOR SYNCHRONIZED COMMUNICATION OVER WIRELESS BACKBONE ARCHITECTURE

BACKGROUND OF THE INVENTION

1. Field of the Invention

The present invention relates generally to synchronizing communication among plural nodes in a communications system and more particularly, to synchronizing communication among plural nodes which communicate within a network having a wireless backbone of repeaters.

2. State of the Art

Communication systems, such as local area networks (LANs), have achieved widespread use for the exchange of information. These systems include a plurality of data processing nodes or "agents", which access a transmission medium that interconnects the nodes. Many local area network schemes have been devised for providing the nodes with a shared access network, or backbone, through which the nodes communicate with each other or with a central hub, or server. Where plural nodes of a network are synchronized to a central hub, local area network schemes have been devised with a central hub organization wherein a backbone of nodes which function as repeaters are interconnected by a wired communication path. Non-repeater nodes are connected to repeater nodes which are directly, or via other repeater nodes, connected to the central hub. These network arrangements typically involve hardwire connections.

More recent efforts have been directed to developing wireless communication networks. For example, commonly assigned U.S. Pat. No. 5,231,634 (Giles et al) relates to a communication system for regulating communication among a plurality of nodes, each of which is equipped with a radio transceiver. The '634 patent describes medium access control of a wireless LAN to provide decentralized, peer-to-peer access for all of the agents. A peer-to-peer communication system is one in which all agents can freely communicate without any agent having an advantage over another.

Wireless communication systems require consideration of potential problems which do not exist in hardwired systems. For example, in a wireless communication system, the nodes and repeaters can be mobile, moving in and out of range of other nodes and repeaters in the system. The '634 patent is directed to continuously ensuring that all agents possess fair access to the communication system (i.e., to avoid, for example, agents which are physically closer to a given destination from having an unfair advantage due to their signal strength being greater than that of agents physically located further from the destination).

Wireless systems also require consideration of radio transmission limits imposed by a physical setting, or even by FCC regulations regarding radio emissions. Due to these considerations, wireless networks, such as the one described in the '634 patent, may have restricted operating flexibility.

Due to their unique considerations, wireless communication systems have not been developed which can freely exploit communication techniques such as central hub organization. Central hub organization is a network scheme involving use of a central, or master repeater, that controls the operation of the network. The master repeater may communicate directly with non-repeater nodes or, in widely distributed networks, through the use of repeater nodes. For purposes of this discussion, both repeater and non-repeater nodes are referred to as "nodes" while repeaters are also referred to as "repeaters". The repeaters in a master repeater network facilitate the propagation of data, control and synchronization information to the nodes, including other repeaters. The repeaters may be in direct contact with the master repeater or, may be in contact with another repeater that is directly or indirectly in contact with a master repeater.

Because of the constraints associated with wireless network schemes, such schemes have at most been used for communications between the nodes and the repeaters of a central hub architecture and not for communications between repeaters. By limiting wireless communications to communications between nodes and repeaters, interference of signals within the overall network can be controlled. For example, all nodes which communicate to the central hub via a first repeater can communicate with the first repeater on a first frequency channel, while all nodes which communicate with the central hub via a second repeater can communicate with the second repeater on a second frequency channel. The nodes connected to a given repeater thus constitute a sub-network, or domain. Each of the repeaters can then communicate with the central hub via a wired link through any number of repeaters to ensure reliable communications. Because repeaters typically handle increased communications (i.e., communications from nodes connected directly to the repeater as well as communication to and from linked repeaters) reliable communication between repeaters can thus be ensured with wired links.

Although techniques exist for enhancing the reliability of wireless communications, these techniques have not been considered practical for use in interconnecting a backbone of repeaters. For example, frequency hopping is a known spread-spectrum technique whereby a signal is transmitted using a plurality of frequencies. The exact frequency used at any given time is switched from one frequency to another either in a random or a predetermined sequence. Frequency hopping is useful in preventing fading errors, and is generally more secure than single channel communication.

While frequency hopping techniques provide reliable and secure wireless communication, conventional frequency hopping techniques are not readily adaptable to a wireless LAN environment, and in particular, a wireless LAN environment which includes a backbone of repeaters which can move into and out of any number of dynamically changing, reconfigurable arrangements. Further, the need to maintain a high level of synchronization for wireless communication has been considered to render its use impractical for high traffic repeaters which are located in communication networks that operate with a number of different frequency channels (e.g., a different frequency channel for each repeater).

It would therefore be desirable to provide the advantages of a central hub organization which exploits the use of wireless links for communication between nodes and repeaters, and for communication between repeaters and a central hub. Further it would be desirable to provide some mechanism for establishing and maintaining synchronization among the repeaters in a dynamically changing, reconfigurable communication system.

SUMMARY OF THE INVENTION

Accordingly, the present invention is directed to providing wireless communication among a plurality of nodes that are synchronized for communication with a central hub that constitutes a master repeater. For example, the present invention is directed to a wireless network having a wireless backbone of repeaters which can use frequency hopping to automatically establish synchronization despite dynamic changes in the wireless communication system. Exemplary embodiments provide for control of synchronization whereby a repeater, when introduced to the system, automatically scans for, and synchronizes to, another repeater, while at the same time continuing to listen for other repeater signals which identify either the master repeater, or another repeater which is closer to the master repeater (i.e., communicates to the master repeater through a more direct communication link).

Generally speaking, exemplary embodiments of the present invention relate to an apparatus and method for establishing and controlling communication among plural nodes (e.g., repeaters) of a network comprising: a first node having means for controlling synchronization of wireless communications between the first node and at least one additional node; and a second node for communicating with the first node, the second node having means for determining the number of nodes in a wireless communications path between the second node and a first node and for using the number to control synchronization of the second node to the first node.

Embodiments of the present invention also relate to an apparatus and method for establishing synchronization between a first node and a second node by selecting a first channel of plural communication channels for use by the first node, the first channel having a first hop sequence of frequencies; and synchronizing communications between the first node and the second node by assigning the second node a second channel of the plural communication channels, the second channel having a hop sequence of frequencies which differs from the first hop sequence but which includes at least one frequency that overlaps a frequency in a hop sequence for each of the plural communication channels, the step of synchronizing further including a step of detecting a frequency overlap of the first channel and the second channel to synchronize communications between the first and second nodes.

BRIEF DESCRIPTION OF THE DRAWINGS

The present invention can be further understood with reference to the following description and the appended drawings, wherein:

FIG. 1 illustrates a multiple node configuration for an exemplary communication system configured with a central hub organization in accordance with the present in invention; and FIG. 2 shows a hop period frame in accordance with an exemplary embodiment of the present invention.

DETAILED DESCRIPTION OF THE PREFERRED EMBODIMENTS

FIG. 1 illustrates an exemplary embodiment of a communication network 100 for interconnecting a plurality of nodes 10 (e.g., communication stations or terminals (T)). The network 100 further includes nodes that function as repeaters. As illustrated in FIG. 1, the communication network 100 includes a central hub represented as a master repeater 11, and additional access point repeaters (AP/R) 12 through 18, of which the repeater 12 is designated as the alternate master. The nodes 10 communicate with the repeaters by radio terminal links (TL) 9. Repeaters communicate with one another by radio backbone links (BL) 19.

As referenced herein, the phrase "backbone link" refers to an arrangement of one or more repeater nodes which facilitate propagation of information in the network 100 between the nodes and the master repeater. The nodes 10 include radio transceivers for communicating with the repeaters 11 through 18. Each of the repeaters 11 through 18 has a transceiver for communicating with the nodes 10, and has a transceiver for communicating with at least one other repeater. The repeaters 11 through 18 constitute the backbone of the exemplary FIG. 1 network that forward communications traffic to and from the nodes 10 and also repeat communications traffic between other repeaters and the master repeater 11. Of course any form of wireless communication, such as optical communication (e.g., infrared), can be used to link the nodes and/or repeaters 12 through 18 to one another and to the master repeater 11 in accordance with exemplary embodiments of the invention.

In accordance with exemplary embodiments, the repeaters 11 through 18 need not be within hearing distance of every other repeater, but are arranged so as to be within hearing distance of at least one other repeater. As referenced herein, "hearing distance" is the physical extent to which one repeater can be positioned relative to another repeater while maintaining reliable direct radio communication between the two repeaters.

One feature of the invention is an ability to provide automatic determination of the depth of a repeater. The term "depth", as referenced herein, is a relative proximity of a given repeater to the master repeater 11 in terms of the number of nodes or backbone communication links between the given repeater and the master repeater. That is, the depth of a given repeater constitutes a parameter which represents the number of repeaters located in the communication path between the given repeater and the master repeater 11, including the given repeater.

The depth parameter value is indicated by "n" for each repeater in FIG. 1. The master repeater 11 has a fixed depth value of zero (n=0). An alternate master repeater 12, which assumes the role of the master repeater when the master repeater is unable to function as the central hub for any reason, is arranged to be within hearing distance of the master repeater 11 and has a fixed depth value of one (n=1). When the master repeater 11 is unable to function, the alternate master repeater retains its depth value of n=1. For repeaters other than the master repeater 11 and alternate master repeater 12, the depth value is dynamic. Referring to FIG. 1, repeaters 13, 16 and 17 have depth designations of n=1 by virtue of their being in direct contact with the master repeater 11. Repeaters 14, 15 and 18 have depth designations of n=2 as they communicate with the master repeater 11 via repeaters 13, 12 and 16, respectively.

As explained in greater detail below, a dynamic depth value permits installation of a new repeater anywhere within hearing distance of an established repeater in the network without disrupting network communication efficiency. This feature can greatly enhance the ease and flexibility of setting up and reconfiguring the network.

When a repeater is added, it begins initialization by automatically scanning for another repeater with which to communicate and synchronize. To this end, each repeater of FIG. 1 can be considered a repeater which includes a means for send and receiving communication, such as a transceiver, as well as a means for searching the communications system for a synchronization signal (i.e., synchronization information) of a first repeater (such as the master repeater). The searching means thus includes means for synchronizing communications, such as any available processor or central processing unit. When a first repeater is found, the added repeater communicates with the found repeater and adopts an appropriate depth parameter. For example, if the repeater 18 and nodes connected thereto were added to the FIG. 1 network, and repeater 18 finds the repeater 16 having a depth value of n=1, the added repeater 18 assumes a depth value of n=2. The added repeater 18, once linked, then communicates with the master repeater through the repeater 16.

Repeaters, once linked, continue to scan for other repeaters having a still lower depth parameter than the repeater to which they are linked. In the example given above, if the added repeater 18, having assumed a depth value of n=2, begins to reliably detect signals from the master repeater 11 (that is, a repeater having a depth lower than that of the repeater to which it currently directly linked), the added repeater 18 drops the link with repeater 16 and re-links to the master repeater 11, thereby assuming an appropriate (lower) depth designation of n=1.

The provision of a feature whereby repeaters automatically link to another repeater in an effort to assume a lowest depth provides a number of advantages. For example such a feature allows for added repeaters to be automatically initialized without any input from an operator or installer. In addition, such a feature organizes repeaters to be as closely in contact with the central repeater as possible. Doing so minimizes traffic along the backbone, and reduces the potential for errors which can occur during retransmission between repeaters (that is, errors associated multiple link arrangements). In a file server type scenario, maintaining communication paths which use the fewest number of links also expedites the transfer of information between the nodes and the master repeater 11.

Linking and synchronizing repeaters in accordance with exemplary embodiments of the present invention is achieved by using a frequency hopping scheme. In an exemplary embodiment, frequency hopping is performed by transmitting/receiving information using a prime number N of different frequencies in a defined sequence to constitute a given communication channel (e.g., sequencing through a prime number, such as 53, 79 or 83 different frequencies in a predetermined order or in a random sequence known by the transmitter and the receiver). The communication system repeatedly switches frequencies during communication, sequencing through all N frequencies of the hop sequence. A repeater maintains a hop frequency for a predetermined period of time before hopping to a next hop frequency in a sequence. This predetermined period of time is referred to herein as the "hop period".

In accordance with exemplary embodiments of the invention, frequency hopping is used to provide secure, reliable synchronized radio communications between the nodes 10 and a given repeater. For example, each repeater and the nodes 10 connected thereto can operate on a channel selected by that repeater.

Further, in accordance with exemplary embodiments, frequency hopping is used to provide reliable communications between the repeaters 11–18. The repeaters can, if desired, communicate over a channel selected by the master repeater for the backbone. To establish communication with one another, the repeaters 11–18 establish and maintain synchronization with one another. This is achieved by synchronizing each added repeater to an established repeater.

In a frequency hopping arrangement in accordance with exemplary embodiments of the present invention, a plurality of communication channels are used, each of which has a predetermined frequency hopping sequence. The hopping sequence of each channel is orthogonal to the hopping sequence in each of the remaining channels available for use in the communication system. That is, each channel's frequency hopping sequence is organized so that for any two of the channels, there will be at least one overlapping frequency in the channels' respective hopping sequences. Hence, if two repeaters are assigned to different channels, they are certain, during at least one hop period, to overlap on a common frequency. Consequently, if an established repeater and a newly added repeater are within hearing distance of each other and are assigned to different channels, they are certain to hear one another on a common frequency during at least one hop period. Once the added repeater hears the established repeater, the added repeater can obtain the necessary synchronization and channel information during the overlapped frequency hop period and link to the established repeater, thereby synchronizing with the communication network.

In an exemplary embodiment of the invention, there are 16 channels each having a predetermined hopping sequence of 53 frequencies. During normal operation, all of the established backbone repeaters are assigned to, and operate on, the same channel and simultaneously hop through the hopping sequence associated with that channel. In an exemplary embodiment, the first fifteen channels (channels 1–15) are used for general communications between the repeaters, and the sixteenth channel (channel 16) is reserved for initialization of added or recovering repeaters.

Each channel's hopping sequence is selected so as to be orthogonal with every other channel hopping sequence. As a repeater hops through the 53 frequency sequence associated with a channel to which it is assigned, any other repeater assigned to any of the other fifteen channels is guaranteed to share a common frequency with the first repeater during at least one hop period. Those skilled in the art will appreciate that the common frequency hop period need not coincide with the boundaries of a hop period, but rather, can bridge two hop periods. For example, during a 300 millisecond hop period, the two repeaters may share a first frequency for the first 100 milliseconds of the hop period, and switch to and share a second common frequency for the remaining 200 milliseconds of the hop period.

In accordance with another feature of the present invention, the alternate master repeater 12 can act as a master repeater to control the backbone network when the master repeater fails for any reason. For example, the alternate master repeater 12 acts as the master in the event that the master repeater 11 fails to operate or is not found by the alternate master repeater 12 when the alternate master repeater 12 is added to the network or recovers from an out of service condition.

In an exemplary embodiment, when the master repeater 11 is initially brought into service, or recovers, it operates on a designated channel (e.g., channel "X"). The alternate master repeater 12, following initialization or recovery, operates on a designated channel (e.g., channel "Y") which is different from that designated for the master repeater 11. The alternate master repeater 12 thus operates on its designated channel, if it does not hear the master repeater 11, such that a split network is formed (that is, a network wherein two repeaters attempt to operate as master repeaters and control synchronization on the same channel). However, the two networks are, over time, resolved into a single network once the master and alternate master hear one another due to the use of channels which include orthogonal hopping sequences that will inevitably overlap.

In operation, the alternate master repeater 12 is synchronized to the master repeater 11 (i.e., the alternate master is operating as a regular repeater). However, if the master repeater 11 goes out of service, the alternate master repeater 12 switches over to its designated channel (e.g., channel "Y"). Provision of a designated channel avoids the creation of a split network that could occur if, for example, the master repeater 11 and alternate master repeater 12 do not initially hear each other. Because channel X and channel Y are orthogonal to each other, the master repeater 11 and alternate master repeater 12 will eventually hear each other and become synchronized on channel X.

SYNCHRONIZING THE BACKBONE NETWORK

The following is a description of an exemplary operation for bringing a repeater in the exemplary backbone network 100 into synchronization and operation.

Initialization of the master repeater 11, in accordance with an exemplary embodiment, involves initially scanning a channel reserved to include synchronization information (i.e., channel 16 in an exemplary embodiment) for a full frequency hop sequence. By scanning for synchronization information on a dedicated synchronization channel (i.e., scanning for overlapping frequencies which will inevitably exist due to use of orthogonal hopping sequences), other nodes and repeaters in the communication system, including the alternate master repeaters, can scan channel 16 to determine the information necessary for synchronizing to the master repeater or when appropriate, the alternate master repeater.

When a second repeater synchronizes to a first repeater, synchronization information is provided by the first repeater which identifies the channel and current hop frequency of the backbone network. Synchronization information also includes a hop timer count which is used to synchronize the time at which the first repeater will hop from the current frequency to the next frequency of the hopping sequence. The hop timer count includes, for example, information regarding the count remaining on the first repeater's hop timer at the time that the synchronization information was generated. The synchronization information also includes depth information regarding the first repeater.

After the second repeater receives the hop timer count, it subtracts an appropriate count for processing and transmission delays, and writes the adjusted value to its hop timer register. Thereafter, the second repeater's hop timer interrupt occurs in synchronization with the rest of the backbone network.

At the time of initialization, the master repeater assumes that the alternate master repeater may be acting as master. The master repeater therefore scans channel 16 to determine the potential synchronization information of the alternate master repeater. If the alternate master repeater 12 is found, then the master repeater 11 sends a re-synchronization message to the alternate master repeater 12 forcing the alternate master repeater 12 to lose synchronization and initiate a scanning of channel 16 in search of the synchronization information of the master repeater 11. After sending the resynchronization message, the master repeater is then assigned to one of the first fifteen channels and starts hopping through the frequency sequence designated for that channel. Repeaters in the network, having lost synchronization with the alternate master repeater 12, also begin to scan channel 16 in search of the master repeater 11.

Initialization of the alternate master repeater 12, in accordance with an exemplary embodiment, involves assigning the alternate master repeater 12 to the reserved synchronization channel (channel 16) for up to a predetermined number (e.g., two) full hop sequences in search of the master repeater 11. If the master repeater 11 is found, then the alternate master repeater 12 synchronizes to the master repeater 11 on the channel (that is, one of channels 1–15) to which the master repeater 11 is assigned. The alternate master repeater 12 then starts transmitting synchronization messages with a depth equal to one (n=1). If the alternate master repeater 12 does not locate the master repeater 11, it assumes master repeater status and starts to transmit synchronization messages on one of the fifteen channels.

Initialization of the repeaters 13 through 18, in accordance with an exemplary embodiment, involves assigning each repeater to the channel reserved for synchronization (channel 16) in order to locate an established repeater within the backbone network. When the repeater hears an established repeater in the backbone network, it switches to the channel assigned to that repeater and listens for a predetermined period of time, such as a complete hop period. If the repeater being synchronized hears another repeater which is already on the same channel and which has a still lower depth designation, the added repeater then begins to transmit synchronization messages having a depth parameter one greater than that of the repeater to which it previously synchronized.

Even after a repeater has fully synchronized to a first repeater, it continues to listen for, and will switch to, a second repeater if the second repeater has a lower depth designation than the first repeater. If a repeater to which a given repeater is presently synchronized changes its depth (for example, the repeater to which the given repeater is synchronized has been moved further from the master repeater) the given repeater will adjust its depth accordingly.

As mentioned previously, the depth parameter of the synchronization message that comes from the master repeater 11 is fixed at zero. For the alternate master repeater 12, the depth parameter is fixed at one, even when the alternate master repeater 12 is acting as the master. For other repeaters, the depth parameter is dynamic. A first repeater synchronized to a second repeater having a control synchronization message with a depth value n, broadcasts a control synchronization message having a depth value of n+1. A dynamic depth parameter can simplify initial installation, and provides for easy relocation of repeaters without having to reset depth parameters.

MASTER REPEATER RECOVERY

The following is a description of recovery operations for scenarios where either the master repeater 11 or alternate master repeater 12 go out of service and then return to service. For purposes of the following discussion, the master repeater will be considered to use channel X, and the alternate master repeater 12 will be considered to use channel Y.

A first exemplary scenario can occur when the master repeater 11, being assigned to and operating on channel X with the alternate master repeater 12 synchronized to it, goes out of service and then returns to service. When the master repeater 11 goes out of service, a predetermined period of time, such as four hop periods, expires before the alternate master repeater 12 and all first level repeaters (that is repeaters having a depth designation of n=1) go out of synchronization. This period of time allows the alternate master repeater 12, and other repeaters, several opportunities to listen for a synchronization message from the master repeater 11 before synchronizing the system to the alternate master repeater. Following the loss of synchronization in the first level repeaters, repeaters having higher depth designations which synchronize off of the first level repeaters will subsequently go out of synchronization, and so on.

The alternate master repeater 12 then begins to scan channel 16 through two hopping sequence cycles looking for the master repeater 11. If the alternate master repeater 12 does not find the master repeater 11, then the alternate master repeater 12 becomes the master and begins operating on channel Y. The repeaters which are out of synchronization scan channel 16 in search of synchronization information which, when located, is used to synchronize the system to the alternate master repeater 12. The network thereafter operates with the alternate master repeater 12 as master on channel Y and the repeaters synchronized to it.

When the master repeater 11 returns to service, it begins to scan channel 16 looking for the alternate master repeater 12 acting as master. When the master repeater 11 finds the alternate master repeater 12, the master repeater 11 sends the alternate master repeater 12 a re-synchronization message to thereby cause the alternate master repeater 12 to switch to channel 16 and begin to search for the master repeater 11. The master repeater 11, after causing the alternate master to resynchronize, places its synchronization information for channel X on channel 16. The alternate master repeater 12 then locates and synchronizes to the master repeater 11. Each level of repeaters in the network (each level being defined by different values of the depth parameter) the loses synchronization and switches to channel 16 looking for a synchronization signal in order to re-synchronize. The repeaters find the master repeater 11, or another repeater subtended to it, and synchronize using the synchronization information obtained from channel 16 and the depth parameter (which is included in the synchronization information each time it is rebroadcast).

In the event that the master repeater 11 returns to service and does not find the alternate master repeater 12 acting as master repeater, the master repeater assumes master status on channel X. The alternate master repeater 12 continues to operate as master on channel Y, thereby establishing a split network. Because the master repeater and alternate master repeater are configured to be within hearing distance of one another, the alternate master repeater 12 will eventually hear the master repeater 11 when hopping frequencies of channel X and channel Y overlap due to their orthogonal characteristic. Because repeaters always seek to locate lower depth level repeaters, the alternate master repeater 12 will find and synchronize to the master repeater 11 by virtue of its lower depth designation (n=0). Once the alternate master repeater 12 hears the master repeater 11, it re-synchronizes to the master repeater as do the repeaters that are synchronized to the alternate master repeater 12. Once the repeaters are synchronized to the master repeater 11, the network is no longer split, and operates with the master repeater 11 acting as sole master.

The following is a description of another exemplary scenario which can occur when the alternate master repeater 12, being synchronized to the master repeater 11 on channel X goes out of service and then returns to service. When the alternate master repeater 12 goes out of service, the network continues to operate with the master repeater 11 as master. When the alternate master repeater 12 returns to service, it scans channel 16 a predetermined number of times (for example, scans channel 16 twice) searching for the master repeater 11. When the alternate master repeater 12 finds the master repeater 11, it synchronizes to the master on channel X. The network continues to operate with the master repeater 11 acting as master.

In the event the alternate master repeater 12 does not find the master repeater 11 when it returns to service, the alternate master repeater 12 attempts to become the master on channel Y. Because the alternate master repeater 12 is operating on channel Y and the master repeater 11 is operating on channel X, the two channels eventually overlap due to their orthogonal characteristic and the alternate master repeater 12 synchronizes to the master repeater 11.

GENERAL COMMUNICATION AMONG NODES

Communication among the various repeaters of the communication system is achieved by assigning the repeaters to a common channel and synchronizing them to align their hop periods. The remaining non-repeater nodes can synchronize in similar fashion to a given repeater.

For example, each repeater can operate on the channel of the backbone network to communicate with other repeaters, and can operate on a separate channel which defines a domain of the repeater (that is, a channel used only by a given repeater and the non-repeater nodes directly connected to the given repeater). For this purpose, each repeater can include two transceivers (that is, one for backbone network communications and one for local domain communications). Alternately, a single multiplexed transceiver can be used to handle communications on both channels and can for example, include buffering and/or any desired prioritizing of communications. Communication data formats can be similar to those described in copending U.S. application Ser. No. 08/205,155 entitled "Frequency Hopping Medium Access Control Protocol", filed Mar. 3, 1994, now abandoned in favor of U.S. application Ser. No. 08/417,907, filed Apr. 6, 1995, which is a Continuation of application Ser. No. 08/205,155 the contents of which are hereby incorporated by reference in their entirety.

In an exemplary embodiment, hop timers included in the repeaters are re-synchronized on a regular basis (for example, every hop period) to correct for errors associated with tolerances of the timing references for each repeater. Each hop period, synchronized counters can be off by several counts, and if repeaters are not re-synchronized often, they can drift. Because the repeaters are re-synchronized every hop period, frequency drifting is corrected in each hop period. Exemplary embodiments can account for frequency drift at the beginning, or end of each hop period in a manner similar to that described in the aforementioned copending U.S. application. For example, the master repeater 11 can delay sending a synchronization message for a predetermined period of time referred to herein as a drift period. The drift period can differ depending on the hop period length.

In exemplary embodiments, synchronization messages can be missed for a maximum of 4 hop periods before a determination is made that synchronization has been lost. In this case, the acceptable hop period error rate is multiplied by 4. The result is multiplied by 2 to account for the master repeater being off by a gain of 100 parts per million (PPM) while the node is off by a loss of 100 PPM, thereby creating an exemplary error rate of approximately 0.08%.

As described previously, the hop period is defined as the amount of time that a node remains at a given frequency before hopping to a new one. FIG. 2 illustrates a breakdown of an exemplary hop period for the backbone network. The period depicted in FIG. 2 is not scaled to reflect the time oriented relationship of the various sections within the period.

A Synchronization Message 21 is broadcast by the master repeater 11 every hop period (or by the alternate master repeater 12 if it is acting as master). The Synchronization Message (labelled "Sync MSG") includes the information that provides first level repeaters the ability to synchronize to the master repeater 11. Repeaters of level n>0 broadcast Control-Synchronization messages in a time slot 25 to allow a next higher level of repeaters (i.e., level n+1) to maintain synchronization and to repeat (i.e., rebroadcast) communications traffic. One or more Control-Synchronization messages are broadcast on every hop to allow repeaters located downstream of the master repeater to remain synchronized to each other and to allow new repeaters to be added to the network. The B-Period 23 is a random access contention period during which all repeaters can contend for bandwidth in a manner similar to that described in the previously mentioned copending application. A drift period 29 can proceed the Synchronization Message 21. Time slots 27 can be used to include information that is transmitted between repeaters.

If there is sufficient communications traffic, the repeaters receive synchronization information, in the form of Control-Synchronization Message(s) 25, as part of the normal network traffic. If there is insufficient communications traffic, and a repeater does not have an opportunity to send a Control-Synchronization message 25 for a predetermined time in a given hop, the repeater broadcasts a request-to-send (RTS) Synchronization Message. A control bit in an RTS-Synchronization frame identifies the RTS-Synchronization frame as a "for synchronization only" frame that requires no response, as opposed to a normal RTS-Synchronization frame that requires a clear-to-send (CTS) response. The Synchronization Message can also be used to allow repeaters to update their hop timers to adjust for drift.

Frames of data transmitted within the communications system can include a variety of additional information and control parameters. A standard frame can include a flag to indicate the start of the frame, an identification code, control information, (e.g., transmission power level, data compression technique, radio speed, and so forth), medium access control length (e.g., frame length), security information, and channel/subchannel. A node/frame type portion of a standard header in each frame can specify antenna diversity (i.e., indicating which antenna is to be used as the sending node), the node type (i.e., node or repeater) and the frame type. Other types of frames can include a resync frame, a resync acknowledgement frame, a sync frame, a request-to-send frame (RTS), a clear-to-send frame (CTS), a request media access frame (RMA), a medium access control acknowledgement frame (MACK), a logical link control acknowledgement frame (LACK), a data message frame, a wake-up message frame, and so forth.

Source and destination addresses for information included in the frame can be included in an extended header definition specified by the user. Those skilled in the art will appreciate that in an exemplary central hub organization, the destination will always be the central hub such that a specific designation of the destination can, if desired, be eliminated. The standard frame header can include a header followed by a source address and, if desired, a destination address.

The network can be overlapped to operate in multiple domains. That is, the different channels can be used so that the network provides a multitude of services. Overlapping network portions can be used to handle different services provided by a central computer linked to the master repeater 11. The domain concept also can be used to geographically manipulate the organization of the network, such as having different domains on each floor of a building, which are interconnected with same overall network.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A communication system comprising:
    a first node having means for controlling synchronization of wireless communications between said first node and at least one additional node; and
    a plurality of second nodes for communicating with said first node, at least one of said second nodes having means for determining a dynamic depth designation representing the number of nodes in a wireless communications path between said first node and said at least one second node, wherein said second node is configured to scan the communication system to dynamically update the dynamic depth designation.

2. A communication system according to claim 1, wherein said first node is a repeater of a radio backbone link in a wireless communications network.

3. A communication system according to claim 2, wherein said first node further includes:
    a radio transceiver for communicating with other repeaters of the radio backbone link.

4. A communication system according to claim 3, wherein said first node further includes an additional transceiver for communicating with nodes that are not included in the backbone link.

5. A communication system according to claim 1, wherein said wireless communications path is an optical communications path.

6. A communication system according to claim 1, wherein said first node is a master repeater of a radio backbone link in the communications system, and said plurality of second nodes are access point repeaters which communicate with one another via said radio backbone link.

7. A communication system according to claim 6, wherein each of said plurality of second nodes has a dynamic depth designation representing the number of nodes located in a communications path to said first node.

8. A communication system according to claim 7, wherein said dynamic depth designations are determined by each of said plurality of second nodes during an initialization process, each of said plurality of second nodes being configured to repeatedly scan the communication system to dynamically update the dynamic depth designations.

9. A communication system according to claim 8, wherein each of said plurality of second nodes are configured to assume a lowest depth designation.

10. A communication system according to claim 1, wherein said first node and said plurality of second nodes communicate with one another using frequency hopping and plural communications channels, each of said plural communications channels including a hop sequence of frequencies wherein at least one frequency overlaps a frequency in the hop sequence of the remaining communications channels.

11. In a communication system having a first node and a second node, a method of dynamically assigning a depth to the second node, wherein a depth assigned to a given node represents a number of nodes between the given node and a master node, the method of assigning a depth to the second node comprising the steps of:

searching the communication system, from the second node, for a synchronization signal of the first node;

extracting a first depth of the first node from the synchronization signal of the first node; and assigning a second depth to the second node which is one level higher than the first depth.

12. Method according to claim 11, wherein each of said first node and said second node are repeaters in a wireless backbone link.

13. Method according to claim 12, further including the steps of:

searching the communication system for a synchronization signal of a third node;

determining a third depth of the third node based on the synchronization signal of the third node;

determining whether the third depth is lower than the first depth; and assigning a depth to the second node which is one level higher than the third depth when the third depth is lower than the first depth.

14. Method according to claim 13, further including steps of:

searching the communication system to locate a synchronization signal from the first node;

determining the first depth of the first node based on the synchronization signal of the first node; and assigning a depth to the second node which is one depth level higher than that of the first node when the depth of the second node will be reduced from its present value.

15. A method for establishing synchronization between a first node and a second node, the method comprising the steps of:

selecting a first of plural communication channels for use by said first node, said first channel having a first hop sequence of frequencies;

assigning said second node any one of said plural communication channels, each of said plural communication channels having a hop sequence of frequencies wherein at least one frequency overlaps a frequency in said first hop sequence; and detecting synchronization information during said frequency overlap to synchronize communications between said first and second nodes.

16. A communications network having a first node and a second node, said second node comprising:

means for sending communications to a first node using a first frequency hopping sequence; and means for synchronizing communications between said first node and said second node by assigning said second node any one of plural communication channels, each of said plural communication channels having a hop sequence of frequencies wherein at least one frequency overlaps a frequency in said first frequency hopping sequence, said synchronizing means further detecting synchronization information during said frequency overlap to synchronize communications between said first and second nodes.

* * * * *